April 7, 1970  J. M. AVIS ET AL  3,504,933
VEHICLE COUNTERWEIGHT

Filed Feb. 1, 1968  3 Sheets-Sheet 1

INVENTORS
JOHN M. AVIS.
HUGH H. DORMAN.
BY
SETTLE, BATCHELDER & OLTMAN.
ATT'YS.

April 7, 1970     J. M. AVIS ET AL     3,504,933

VEHICLE COUNTERWEIGHT

Filed Feb. 1, 1968     3 Sheets-Sheet 2

INVENTORS
JOHN M. AVIS.
HUGH H. DORMAN.
BY
SETTLE, BATCHELDER & OLTMAN.
ATT'YS.

INVENTORS
JOHN M. AVIS.
HUGH H. DORMAN.
BY
SETTLE, BATCHELDER & OLTMAN.
ATT'YS.

United States Patent Office 3,504,933
Patented Apr. 7, 1970

3,504,933
VEHICLE COUNTERWEIGHT
John M. Avis, Terre Haute, Ind., and Hugh H. Dorman, Huntington, N.Y., assignors to J. I. Case Company, Racine, Wis., a corporation of Wisconsin
Filed Feb. 1, 1968, Ser. No. 702,268
Int. Cl. B60r 27/00
U.S. Cl. 280—150        5 Claims

ABSTRACT OF THE DISCLOSURE

A load supporting powered vehicle which includes a counterweight mechanism carried within the confines of the vehicle frame and is shiftable laterally longitudinally of the frame to effectively shift the center of gravity of the vehicle along the longitudinal axis of the frame.

Background of the invention

The present invention relates generally to powered vehicles and more particularly to an improved sliding counterweight mechanism for such vehicles.

There are many industrial applications for powered vehicles wherein the use of a movable counterweight is of recognized advantage. Thus, for example, when a load is supported on one end of the vehicle, a counterbalancing action on the opposite end of the vehicle is almost a necessity. However, when the vehicle is being transported without any load thereof, the counterweight on one end of the vehicle, which normally has ground engaging members that are used to steer the vehicle, impairs the free maneuverability of the vehicle. Furthermore, on a fixed counterbalancing mechanism, a considerable loss of traction is encountered when there is no load adjacent the end of the vehicle which carries the driven wheels.

One of the most common types of counterweight mechanisms for a powered vehicle of the above type is to have some type of pivoted mass supported exteriorly of the vehicle to be moved to a plurality of positions thereby balancing the load. However, in a vehicle having, for example, a forklift attachment thereon must many times be operated within confined spaces and any exterior counterweight system is often very cumbersome as well as very annoying to the operator.

Any other type of counterweight system or mechanism includes a mass that is shiftable longitudinally of the frame. However, this type of arrangement has only found limited success in the industry because most of these devices unnecessarily increase the cost as well as the number of parts for the vehicle.

Summary of the invention

The present invention obviates all of the shortcomings of the prior art type of devices and includes a counterweight mechanism which is wholly disposed within the confines of the vehicle body and may be moved to an infinite number of positions longitudinally of the vehicle to selectively position the center of gravity. The counterbalancing mechanism includes a pair of individually operated ballasts having a minimum number of moving parts thus substantially eliminating any maintenance for keeping the counterbalancing mechanism operative.

The primary object of the present invention is to provide an improved counterbalancing mechanism which is supported within the confines of the vehicle body.

Another object is to provide a pair of independently operated counterweights disposed on opposite sides of the vehicle frame.

A further object of the invention is to provide an improved counterbalancing mechanism which can readily be modified to increase or decrease the mass of the counterbalancing mechanism.

Other objects of this invention will appear in the following description and appended claims reference being had to the accompanying drawings forming a part of this specification wherein like reference characters designate corresponding parts of the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
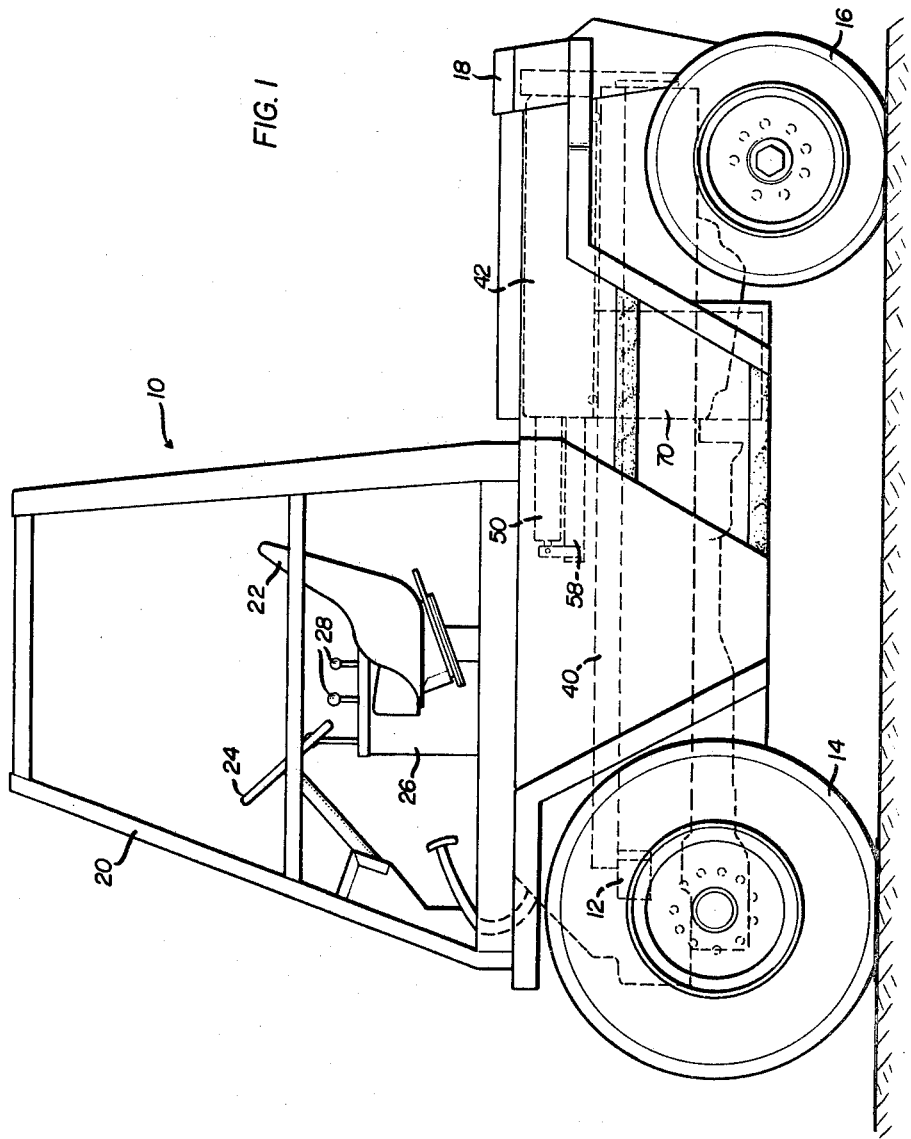
FIGURE 1 shows a side elevational view of a vehicle having the counterbalancing mechanism of the invention incorporated therein.

As shown on the drawings:

FIGURE 1 of the drawings shows a vehicle or truck, generally designated at 10, which may have a load supporting assembly, such as a forklift or shovel (not shown) supported at one end thereof. The vehicle 10 includes a frame 12 supported on a pair of driven wheels 14 and a pair of steering wheels 16 only one of each being shown in FIGURE 1.

The frame 12 has an outer body structure 18 supported thereon with an open frame type structure 20 defining a cab for the vehicle. The frame structure 20 encloses an operator's seat 22, a steering wheel 24 and a control panel or mechanism 26 which includes control levers 28 that may be selectively attached to power the counterweight mechanism of (to be described hereinafter) as well as the control for any load supporting device attached to the vehicle adjacent the driven wheels 14.

Figure 2:
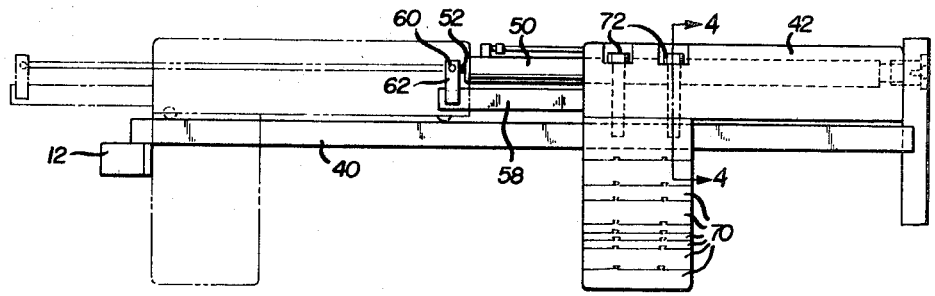
FIGURE 2 is a side elevation of the counterweight mechanism of the present invention.
Figure 3:
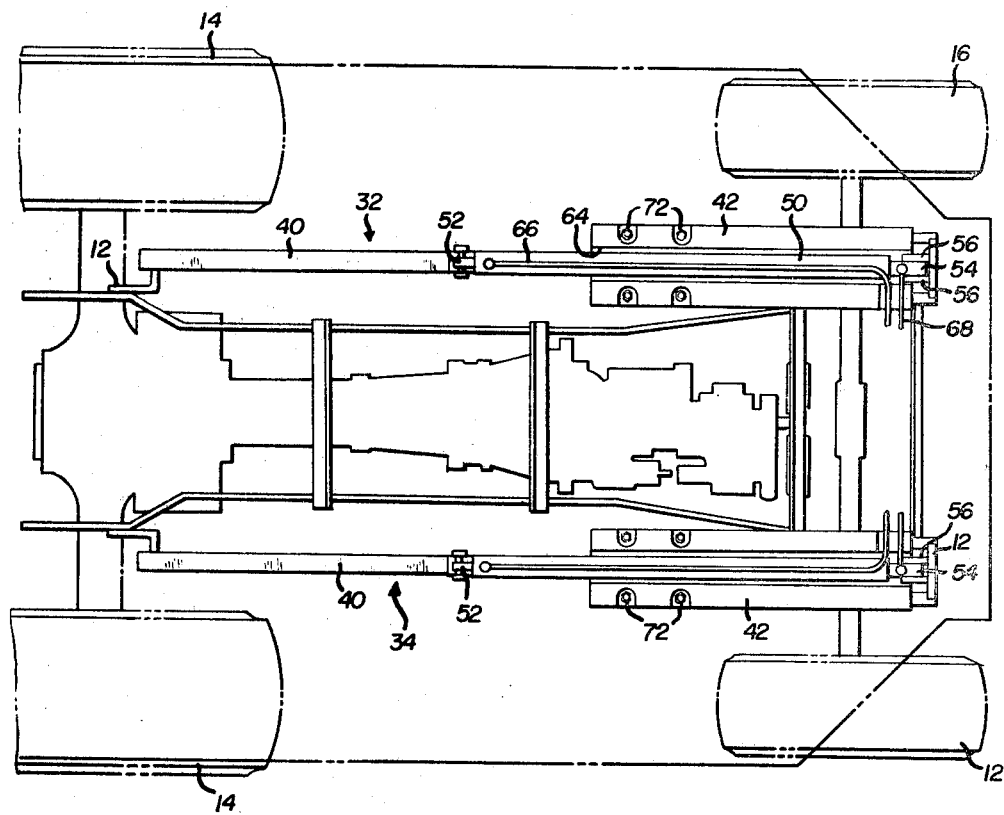
FIGURE 3 is a plan view of the counterbalancing mechanism shown in FIGURE 2 with parts of the vehicle shown in phantom.

According to the invention, a counterbalancing mechanism is supported on the frame 12 of the vehicle and is completely confined by the body 18 thereof. The counterbalancing mechanism is specifically shown in FIGURES 1 through 4. As shown in FIGURE 3 the counterbalancing mechanism 40 includes individually controlled left-hand and right-hand counterbalancing means, 32 and 34, disposed on opposite sides of the longitudinal center axis of the vehicle. Since the mechanisms 32 and 34 are identical in construction, only one will be described in detail.

The counterbalancing means 34 includes a track 40 fixedly secured at the forward and rearward ends thereof on the frame 12. The track 40 is illustratively shown as a hollow rectangular beam clearly shown in FIGURE 4.

The counterbalancing mechanism further includes a ballast or weight 42 slidably supported in frictional contact with the upper surface of the beam. For this purpose, the ballast 42 has a recess 44 in the bottom surface thereof which in cross section is substantially identical to the cross section of the beam 40. Thus, by having the track 40 received in the recess 44, the entire ballast or weight 42 is supported for guiding and sliding movement along the track.

The counterweight mechanism 34 further includes means for moving the ballast 42 along the track 40. In the illustrated embodiment this means includes a hydraulic cylinder 50 having a piston rod 52 reciprocating therein. One end of the cylinder 50 has a lug 54 secured thereto which is secured to ears 56 forming part of the fixed frame 12 of the vehicle 10.

Figure 4:
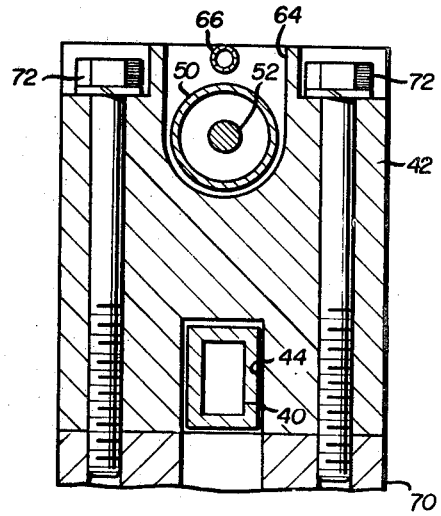
FIGURE 4 is a vertical cross sectional view taken generally along lines 4—4 of FIGURE 2.

The ballast 42 has an extention 58 fixedly secured thereto which is interconnected with the piston rod 52 through a pin 60 and a pair of lugs or plates 62. As shown in FIGURES 2 and 4, the cylinder 50 is preferably disposed in a recess 64 formed in the upper surface of the ballast 42 to limit the amount of space required for the entire installation.

Thus, it can be readily seen that the cylinder is supported at opposite ends and thus is suspended within the space defined by the recess 64. Suitable hydraulic connections 66 and 68 are provided from a hydraulic pressurized fluid source to opposite ends of the cylinder so that the cylinder may be actuated by actuation of a valve connected to a control lever 28.

According to another aspect of the invention, the ballast of the counterweight mechanism may readily be varied by attaching blocks of various sizes to the main ballast 42. Thus, as illustratively shown in FIGURES 3 and 4, a plurality of blocks or weights 70 are removably secured to the lower surface of the ballast or counterweight 42. Any type of securing means may be provided for securing the blocks 70 and in the illustrated embodiment the securing means is shown as bolts 72 extending through openings in the ballast 42 and threadedly received in openings in the blocks 70.

From the above description, it is readily apparent that the weight or counterbalance means on each side of the vehicle may be independently moved to various positions to simultaneously maintain a balance between the load carried at the forward end of the vehicle as well as maintaining a proper traction on the driven wheels 14 when no load or only a partial load is carried by the vehicle.

In actual practice it has been found that in most instances mere lubrication between the upper surface of the track or beam 40 and the ballast 42 will be sufficient to reduce the friction between the beam 40 and the ballast 42 so that the ballast may readily be movable without applying extreme pressure or force through the cylinder and piston rod 50, 52. However, if a large weight is required and the frictional forces become excessive, a slightly modified version of the ballast may readily be utilized to overcome these frictional forces.

Figure 5:
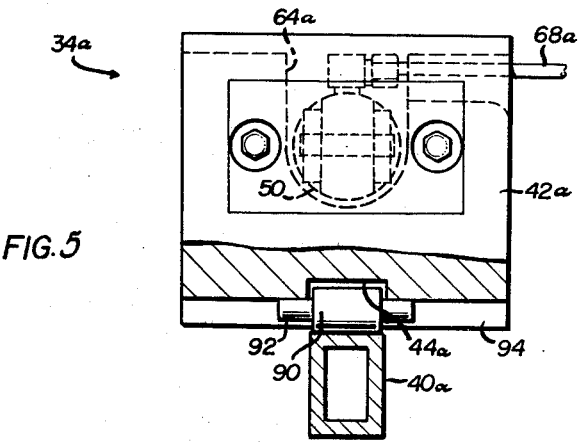
FIGURE 5 is a sectional view similar to FIGURE 4 shows a modification for the counterbalancing mechanism.

As shown in FIGURE 5, the counterbalancing mechanism is designated as 34a and all of the reference numerals of the various parts have been designated by the suffix (a) to indicate the relationship of these parts with the embodiment shown in FIGURE 4. In the modified embodiment shown in FIGURE 5, antifriction means in a form of rollers 90 (only one being shown) rotatably supported on shafts 92 which in turn are disposed in enlarged portions 94 of the recess 44a. Thus, the rollers greatly reduced the frictional forces between the track 40a and the ballast 42a.

From the above description it can readily be appreciated that the vehicle with the counterbalancing means of the invention incorporated therein is very compact and simple in construction and substantially free. Also, by providing two independently actuated counterbalancing means, the tractive force on either of the driven wheels may be individually controlled to thereby increase the efficiency of operation of the machine whenever the conditions require.

While one exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

We claim:
1. In a load supporting powered vehicle which includes a frame and ground engaging means on opposite sides supporting said frame, the improvement of counterbalancing means carried by said frame between said ground engaging members, said counterbalancing means comprising a track, a ballast movably supported on said track, said ballast having a portion thereof engaging a major portion of said track for sliding and guiding movement and a recess spaced from said portion and parallel therewith, a plurality of weights selectively attachable to said ballast on the side opposite said recess so as to be aligned with each other in a direction transverse to the direction of movement of said ballast on said track, and power means for shifting said ballast along said track to shift the center of gravity of said vehicle longitudinally of said frame, the power means being positioned within recess.

2. A vehicle as defined in claim 1, further including an anti-friction roller element interposed between said track and said ballast.

3. A vehicle as defined in claim 1, further including a second track supporting a second ballast with a second independent power means moving said second ballast along said second track, said tracks being respectively located adjacent opposite sides of said frame between said ground engaging means.

4. Counterbalancing apparatus for a vehicle adapted to support a load adjacent one end thereof comprising a ballast having a track recess defined in a major surface thereof and an opposite parallel recess, a track having a cross-sectional area corresponding to said track recess and slidably supporting said ballast, means carried by said ballast including a plurality of weights selectively attachabe to said ballast on the same side as said track recess and extending in a direction transverse to the direction of movement of said ballast on said track for selectively varying the mass of said ballast, and power means for positioning said ballast in an infinite number of positions on said track whereby to balance the load on the vehicle said power means including a motor fitted within the parallel recess.

5. Apparatus as defined in claim 4, in which said last motor includes a cylinder and piston rod interposed between the vehicle and ballast, and means for extending and retroacting said piston rod in said cylinder.

References Cited

UNITED STATES PATENTS

| | | |
|---|---|---|
| 2,276,713 | 3/1942 | Bramble. |
| 2,820,556 | 1/1958 | Davis. |
| 2,916,172 | 12/1959 | Locke. |
| 3,032,352 | 5/1962 | Barrett. |

FOREIGN PATENTS

| | | |
|---|---|---|
| 91,231 | 3/1958 | Norway. |

LEO FRIAGLIA, Primary Examiner

L. J. PAPERNER, Assistant Examiner

U.S. Cl. X.R.

187—9